(12) United States Patent
Sane

(10) Patent No.: US 7,702,021 B2
(45) Date of Patent: Apr. 20, 2010

(54) DECODING OF DIGITAL VIDEO STANDARD MATERIAL DURING VARIABLE LENGTH DECODING

(75) Inventor: Aniruddha Sane, Bangalore (IN)

(73) Assignee: Broadcom Corporation, Irvine, CA (US)

(*) Notice: Subject to any disclaimer, the term of this patent is extended or adjusted under 35 U.S.C. 154(b) by 1356 days.

(21) Appl. No.: 10/765,809

(22) Filed: Jan. 27, 2004

(65) Prior Publication Data

US 2005/0163222 A1    Jul. 28, 2005

(51) Int. Cl.
*H04N 7/12* (2006.01)
(52) U.S. Cl. .............. 375/240.25; 375/240; 375/240.01
(58) Field of Classification Search ................. 375/240, 375/240.01, 240.12, 240.23, 240.25; 365/201; 370/473; 386/68; 382/232
See application file for complete search history.

(56) References Cited

U.S. PATENT DOCUMENTS

| | | | | |
|---|---|---|---|---|
| 5,481,543 A | * | 1/1996 | Veltman | 370/473 |
| 5,852,469 A | * | 12/1998 | Nagai et al. | 375/240.23 |
| 5,956,454 A | * | 9/1999 | Shinohara et al. | 386/68 |
| 6,259,639 B1 | * | 7/2001 | Hashizume | 365/201 |
| 2003/0026487 A1 | * | 2/2003 | Wada et al. | 382/232 |

* cited by examiner

*Primary Examiner*—Allen Wong
(74) *Attorney, Agent, or Firm*—McAndrews Held & Malloy, Ltd.

(57) ABSTRACT

Systems and methods for decoding of digital video standard material during variable length decoding are disclosed. In one embodiment, a method in accordance with the present invention may comprise, for example, receiving a first portion of encoded video data stream and a second portion of encoded video data stream, wherein the first portion and the second portion are parts of one encoded symbol in an encoded video data stream; generating a concatenated video data stream comprising the first portion and the second portion; and decoding the concatenated video data stream.

9 Claims, 7 Drawing Sheets

DECODING OF DIGITAL VIDEO STANDARD MATERIAL DURING VARIABLE LENGTH DECODING

RELATED APPLICATIONS

[Not Applicable]

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Digital video compression standards encode portions of digital video using variable length coding. Accordingly, such portions are encoded in variable length data structures. However, some standards, such as DV-25 attempt to allocate a fixed number of bits for each block. In DV-25, where a block exceeds its allocation, the remainder of the block is carried with another block that does not use all of its allocation.

Accordingly, the blocks are not necessarily carried continuously in a DV-25 encoded bitstream. As well, storage of the bitstream in a memory, will not necessarily result in storage of a block in continuous memory locations. Accordingly, parsing continuous addresses in the memory results in discontinuous decoding of blocks.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods for decoding of digital video standard material during variable length decoding. In one embodiment, a method in accordance with the present invention may comprise, for example, receiving a first portion of encoded video data stream and a second portion of encoded video data stream, wherein the first portion and the second portion are parts of one encoded symbol in an encoded video data stream; generating a concatenated video data stream comprising the first portion and the second portion; and decoding the concatenated video data stream.

In another embodiment, a system in accordance with the present invention may comprise, for example, a first memory buffer for receiving a first portion of encoded video data stream; a second memory buffer for receiving a second portion of encoded video data stream; a concatenator for concatenating the first portion and the second portion to obtain a concatenated video data stream; and a decoder for decoding the concatenated video data stream.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
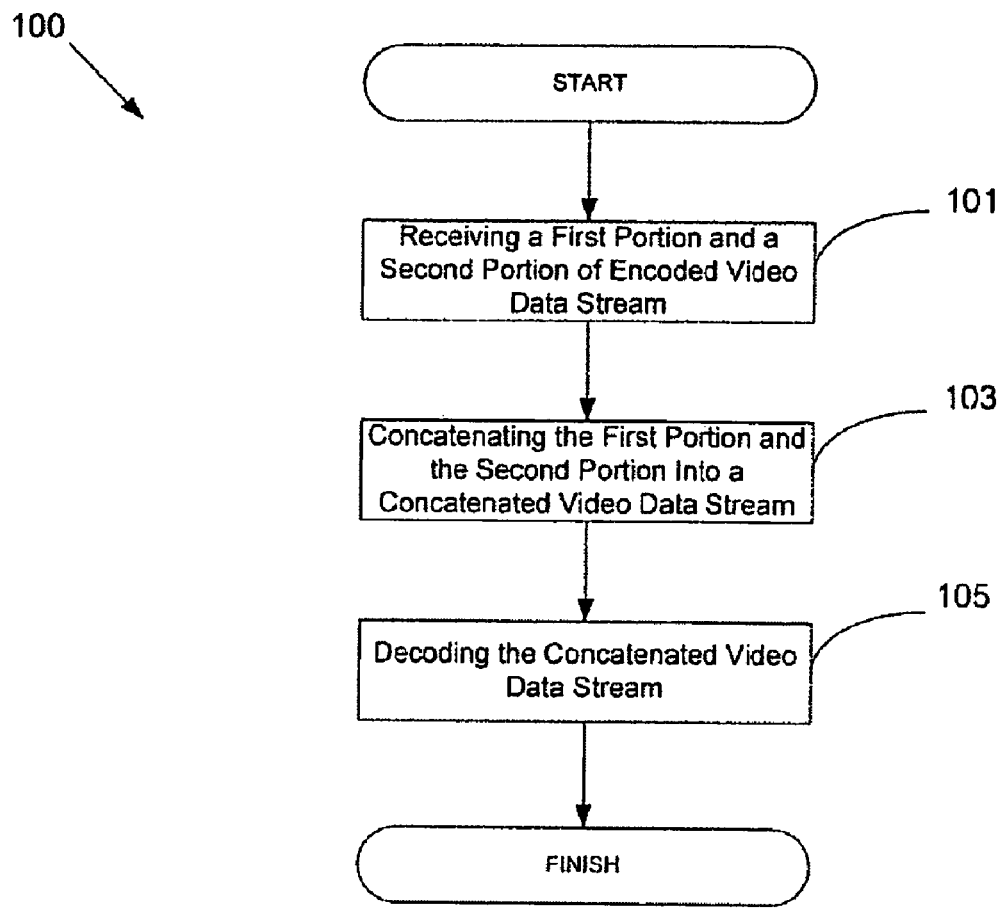
FIG. 1 illustrates a flow diagram of a method for decoding of encoded video data stream, in accordance with an embodiment of the present invention.

Referring now to FIG. 1, there is illustrated a flow diagram of a method 100 for decoding a data stream, in accordance with an embodiment of the present invention. In step 101, a first and a second portion of encoded data stream are received. For example, a first portion of the encoded data stream may be stored in a first memory and a second portion of the encoded data stream may be stored in a second memory. In step 103, the first portion of encoded data stream is concatenated with the second portion of encoded data stream. Decoding of the concatenated data stream is achieved in step 105. The foregoing method can be used advantageously in a variety of applications, including decoding video data, such as video data encoded to the DV-25 standard.

Figure 2:
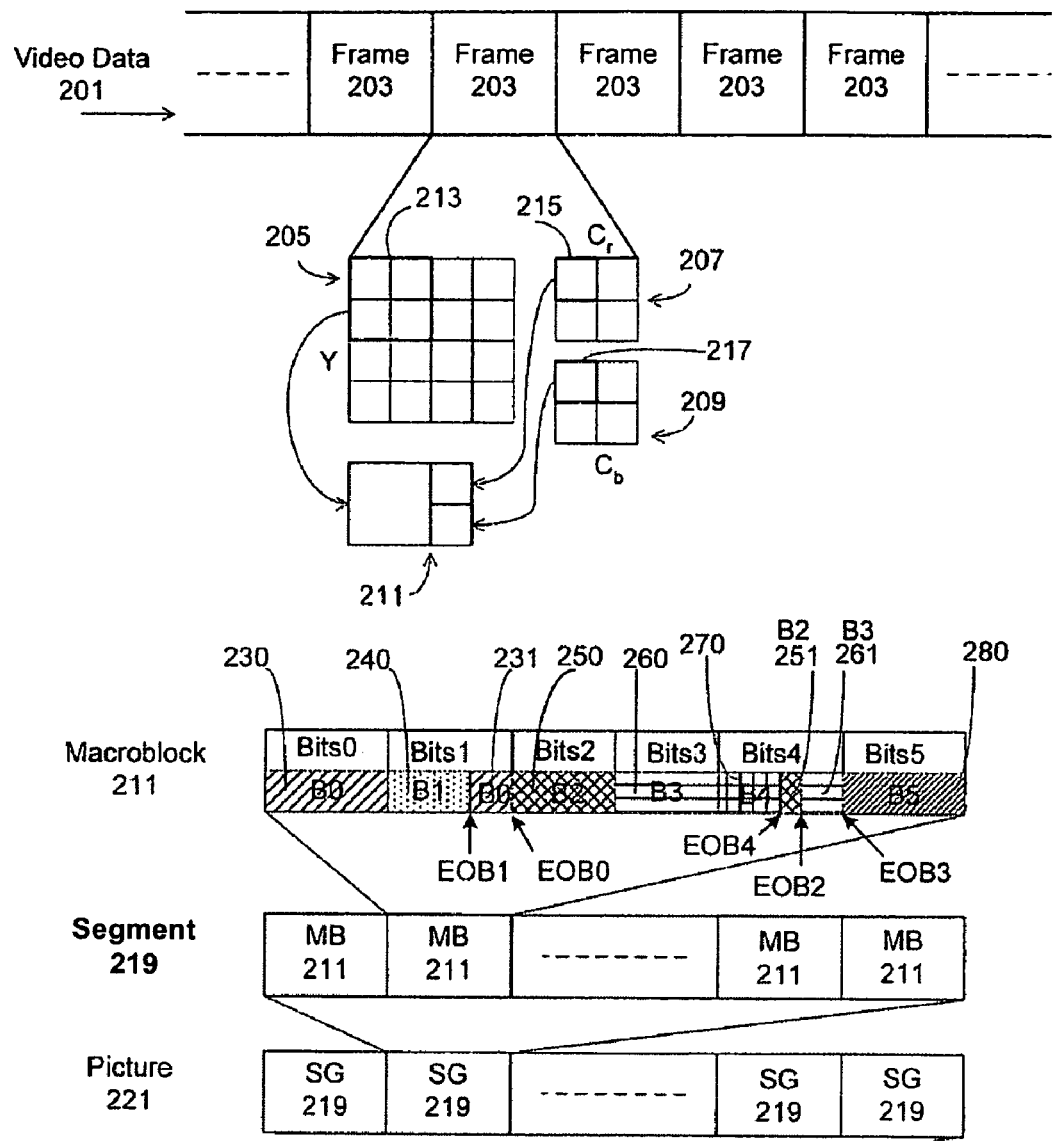
FIG. 2 illustrates a block diagram of an exemplary Digital Video (DV-25) encoding process, in accordance with an embodiment of the present invention.

FIG. 2 illustrates a block diagram of an exemplary Digital Video (DV-25) encoding process of video data 201, in accordance with an embodiment of the present invention. The video data 201 comprises a series of frames 203. Each frame 203 comprises two-dimensional grids of luminance Y, 205, chrominance red Cr, 207, and chrominance blue $C_b$, 209, pixels. The two-dimensional grids are divided into 8×8 blocks, where a group of four blocks or a 16×16 block 213 of luminance pixels Y is associated with a block 215 of chrominance red $C_r$, and a block 217 of chrominance blue $C_b$ pixels. The block 213 of luminance pixels Y, along with its corresponding block 215 of chrominance red pixels $C_r$, and block 217 of chrominance blue pixels $C_b$ form a data structure known as a macroblock 211.

Each macroblock comprises six blocks, B0 through B5. Each of the six blocks B0 to B5 is allocated a fixed number of bits. When a macroblock is encoded by the encoder, each of the allotted bits are filled in sequentially with encoded blocks. If a block requires more than its allotted bits, the remaining block portion, or "block tail," is stored elsewhere. If, on the other hand, a block is smaller than its allotted bits, the block is saved in the allotted bits in its entirety and an "end-ofblock" signal is stored at the end of the block. The remaining allocated bits may be utilized for storing the "block tails" of other blocks that are larger in size than their allotted bits.

For example, the block B0, 230, may be stored starting with allocated Bits0. However, lock B0 is bigger than allocated Bits0 and there will be a remaining "block tail" 231. After allocated Bits0 are filled up, block B1, 240, may be stored in Bits1. However, block B1 is smaller than the allocated Bits1, resulting in available empty space. After storing block B1 in allocated Bits1, an end-of-block signal EOB1 may be recorded, and the remaining space in allocated Bitsl may be utilized for storing the "block tail" 231 of block B0. Similarly, the blocks B2 and B3, 250 and 260, completely utilize allocated Bits2 and allocated Bits 3. Block B4, 270, may be smaller than allocated Bits4, and the remaining space may be utilized for storing the "block tails" 251 and 261 of blocks B2 and B3 respectively. Block B4 and the "block tails" 251 and 261 may be separated from each other by end-of-block signals EOB4, EOB2 and EOB3.

The macroblocks 211 representing a frame are grouped into different segments 219. The segment 219 includes the macroblocks 211, as well as additional parameters describing the segment. Each of the segments 219 forming the frame form the data portion of a picture structure 221. The picture 221 includes the segments 219 as well as additional parameters that further define the picture 221. The pictures 221 are further processed and carried in transport packets forming a transport stream.

Figure 3:
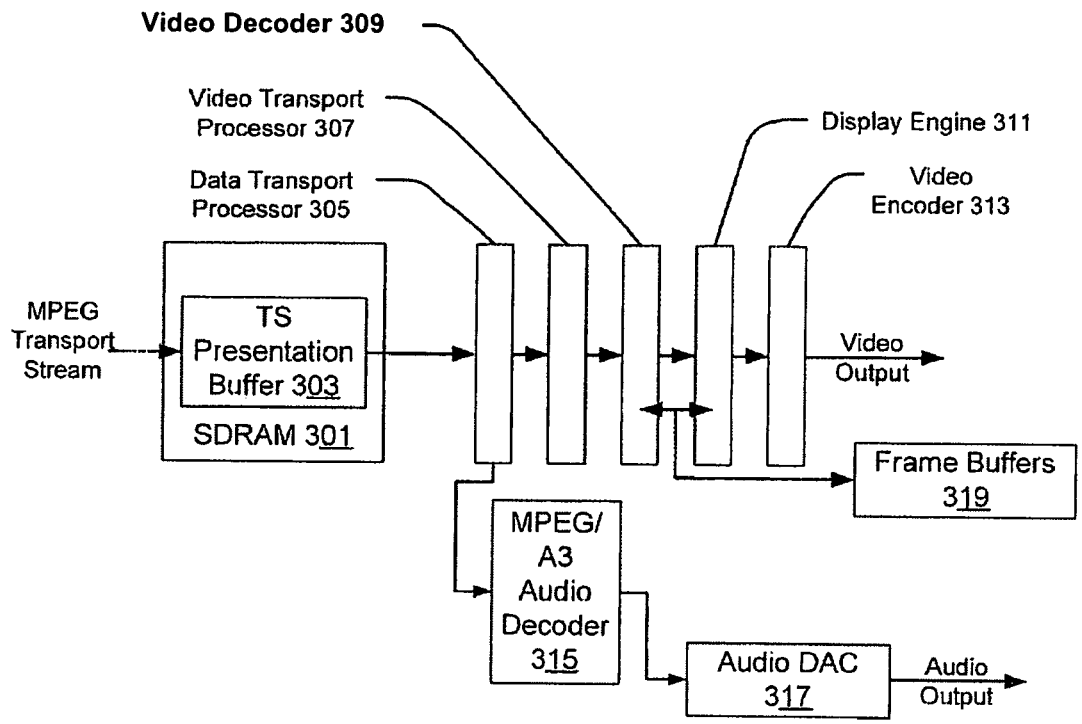
FIG. 3 illustrates a block diagram of an exemplary circuit for decoding the compressed video data, in accordance with an embodiment of the present invention.

FIG. 3 illustrates a block diagram of an exemplary circuit for decoding the compressed video data, in accordance with an embodiment of the present invention. Data is received and stored in a presentation buffer 303 within a Synchronous Dynamic Random Access Memory (SDRAM) 301. The data can be received from either a communication channel or from a local memory, such as, for example, a hard disc or a DVD.

The data output from the presentation buffer 303 is then passed to a data transport processor 305. The data transport processor 305 demultiplexes the transport stream into packetized elementary stream constituents, and passes the audio transport stream to an audio decoder 315 and the video transport stream to a video transport processor 307 and then to a DV-25 video decoder 309. The audio data is then sent to the output blocks, and the video is sent to a display engine 311.

The display engine 311 scales the video picture, renders the graphics, and constructs the complete display. Once the display is ready to be presented, it is passed to a video encoder 313 Where it is converted to analog video using an internal digital to analog converter (DAC). The digital audio is converted to analog in an audio digital to analog converter (DAC) 317.

The video decoder 309 decodes the pictures 221 and stores the pictures in frame buffers 319. The pictures are decoded on a macroblock by macroblock basis. Additionally, each macroblock comprises six blocks. The macroblocks are decoded on a block by block basis. However, as noted above, the blocks are not necessarily coded continuously. Accordingly, the discontinuous portions of the blocks forming the macroblocks are concatenated together to form continuous portions for decoding.

Figure 4:
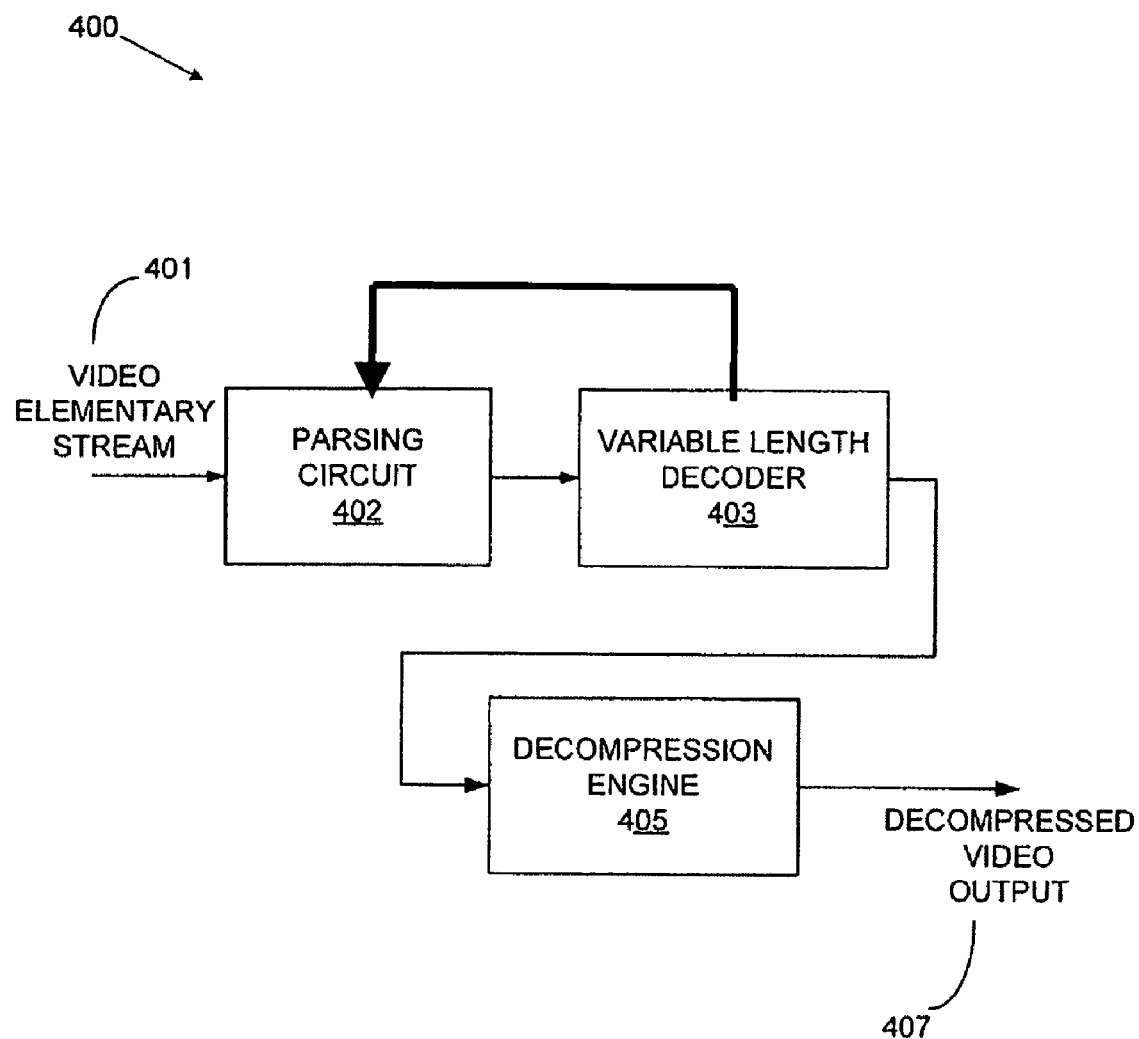
FIG. 4 illustrates a block diagram of an exemplary video decoder unit for decoding video data, which is part of the circuit for decoding compressed video data of FIG. 3, in accordance with an embodiment of the present invention.

FIG. 4 illustrates a block diagram of an exemplary video decoder unit 400 for decoding video data, which is part of the circuit for decoding compressed video data of FIG. 3, in accordance with an embodiment of the present invention. The pictures 221 are decoded on a macroblock by macroblock basis, where each macroblock comprises six blocks. However, the encoded data structures for each block are not of equal length and, as explained above, a block may comprise a tail that is stored separately. In order to generate a properly decompressed video output 407, the parsing circuit 40 organizes the blocks in a continuous and sequential stream of encoded data. The parsing circuit 402 parses the segments 219, macroblock by macroblock so that each portion of a data structure are concatenated sequentially forming a single data structure, and the resulting concatenated data structures are sent to the variable length decoder 403 in a continuous stream of encoded sequential data. After decompression, the decompressed video output 407 may then be sent to a display engine for further processing.

Figure 5:
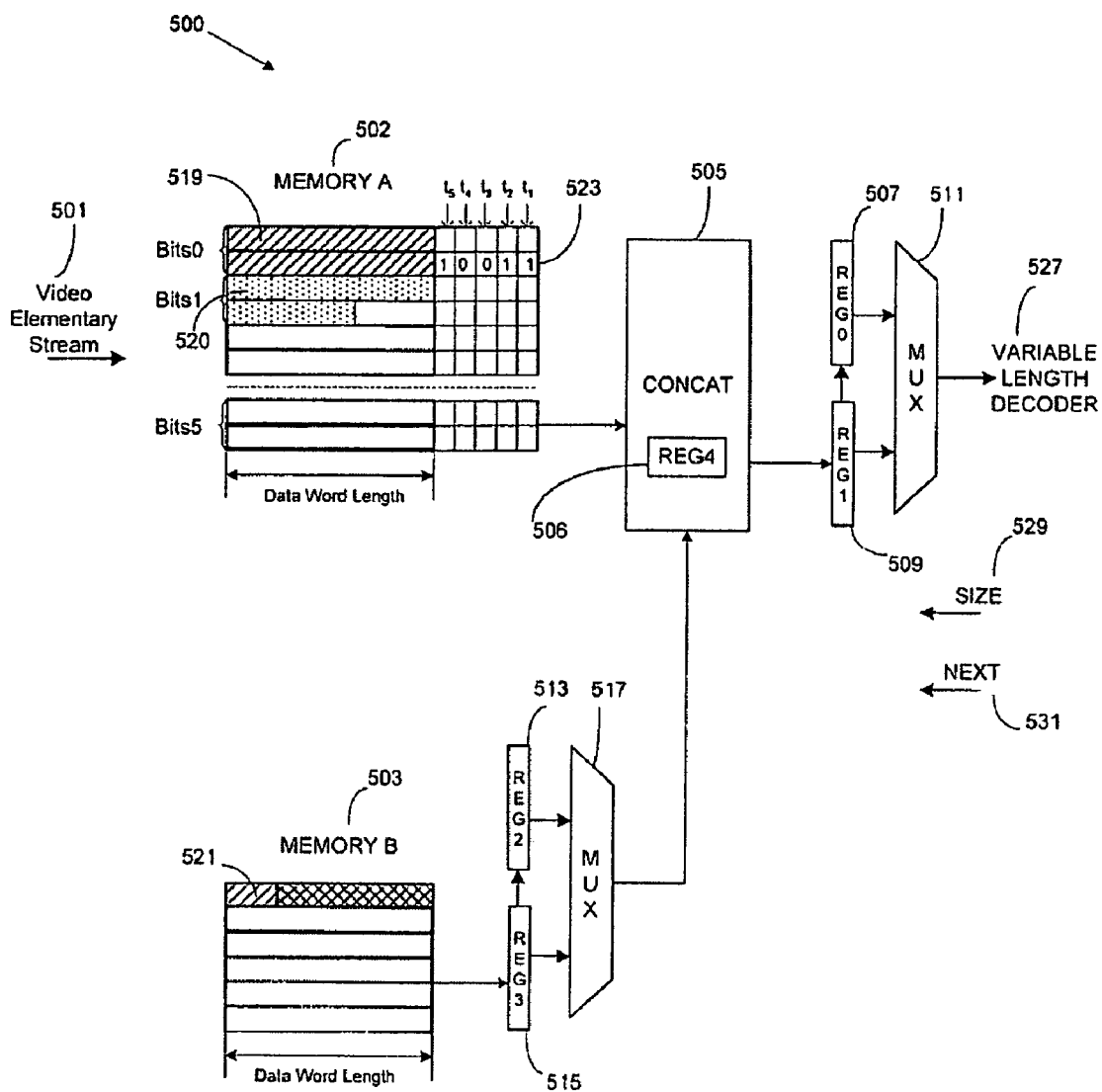
FIG. 5 illustrates a block diagram of a parsing circuit in the exemplary video decoder unit of FIG. 4, in accordance with an embodiment of the present invention.

FIG. 5 illustrates a block diagram of a parsing circuit 500 in the exemplary video decoder unit of FIG. 4, in accordance with an embodiment of the present invention. The circuit 500 comprises memory A 502, memory B 503, a first pair of registers, register 507 and register 509, a second pair of registers, register 513 and register 515, a first multiplexer 511, a second multiplexer 517, a concatenator 505, and a concatenator register 506.

The encoded video elementary stream 501 may comprise a plurality of macroblocks, where each macroblock comprises six blocks. As previously noted, the encoded blocks in each macroblock in the video elementary stream 501 are not necessarily continuous. A given block may be stored in one set of allocated bits, whereas its remaining portion, the "block tail," may be stored in another set of allocated bits. The boundaries of encoded blocks within a macroblock are identified by either an end-of-block (EOB) signal, or by fix bit positions, i.e., by the fixed boundary of each set of allocated bits.

Memories A and B are adapted to save one macroblock at a time, i.e., six blocks worth of data. Parsing of encoded blocks from a video elementary stream 501 into memory A will continue until allocated Bits0 are finished or until there is an EOB signal for block B0. For example, block B0, 519, that is received into memory A is larger than the allocated Bits0 that are stored in memory A, 502. The remaining portion of block B0, or its "block tail," 521, is stored in memory B, 503. Memory A can comprise 16-bit data words. In the case where block B0 is larger than allocated Bits0, memory A may be adapted to save additional tag information 523. The tag 523 may have, for example, five bits, $t_1$ through $t_5$. If block B0 is larger than allocated Bits0, then the portion of block B0 from allocated Bits0 will terminate at a particular data word. For the particular data word, where the portion of block B0 terminates, the first tag $t_2$ may be marked with a "1." The remaining tags, $t_2$ through $t_5$, may indicate the bit position where the portion of block B0 in allocated Bits0 terminates.

Blocks B0, B2, and B3 are larger than allocated Bits0, Bits2 and Bits3, respectively. Accordingly, the allocated Bits0, Bits2 and Bits3 are stored in memory A, concluding at particular bit positions in particular data words. For these data words, tag $t_1=1$ will indicate that the allocated Bits0, Bits2 and Bits3 terminate at the data words associated with their tag, and that "block tail" portions of blocks B0, B2 and B3 will be stored in memory B. The remaining bits $t_2$ through $t_5$ indicate the bit positions where blocks B0, B2 and B3 in the allocated Bits0, Bits2 and Bits3, respectively, terminate.

Allocated Bits1 and Bits4 are stored in memory A at the beginning of the next subsequent data word after the data word where allocated bits end. The EOB signals for blocks B1, 520, and B4 are encountered prior to the end of allocated Bits1 and Bits4. After the EOB of block B1, the "block tail" of block B0 is encountered. The "block tail" of block B0 is stored in memory B until the EOB for the "block tail" of B0 is encountered. After the EOB for block B4 is encountered in memory A, the "block tails" of blocks B2 and B3 are encountered. The "block tails" of B2 and B3 are then stored in memory B until the EOB for those tails is encountered.

Blocks that occupy all of their allotted bits are separated by an EOB signal. For example, blocks B2 and B3 fully occupy their allotted bits and are separated from each other by an EOB signal.

After the first pass of parsing encoded data structures from one macroblock into memories A and B, memory A will contain the beginning portions of the six blocks, B0 through B5. Memory B contains any "block tails," separated by EOB signals. Since memory B contains encoded "block tails," which comprise end portions of encoded blocks from memory A, the decoding of each "block tail" in memory B is performed after the decoding of the corresponding data structure in memory A.

In order to decode the encoded data in both memories, encoded blocks from memory A may first be sequentially outputted to the concatenator 505. Encoded blocks from memory A will be sent to the concatenator until an "end-of-block" signal is reached, or until an active tag is reached (i.e., tag $t_1=1$), indicating that the current block is larger than the allotted bits stored in memory A, and that its remaining "block tail" is stored in memory B. If an EOB signal is reached, the concatenator 505 will start reading from the next data word in memory A, and subsequently send it to a decoder 527 for decoding. If an active tag is reached, (i.e., tag $t_1=1$), then tags $t_2$ through $t_5$ will indicate the position in the current data word where the current block terminates within its allotted bits. Since the encoded "block tails" in memory B are separated by EOB signals, parsing in memory B will continue until an EOB signal is reached. At that time, parsing will switch back to memory A. Encoded blocks from memory A will be sent to the concatenator 505 until another active tag is reached indicating the existence of a "block tail" in memory B.

To ensure that encoded block data from memory B is serially outputted to the concatenator so that it is properly concatenated with its respective preceding data from memory A, a pair of registers REG 2 and REG 3, 513 and 515, and a multiplexer 517 are utilized. Registers REG2 and REG 3, and multiplexer 517 will ensure that the proper encoded "block tail" from memory B, with a size corresponding to data word width minus the number contained in tags $t_2$ through $t_5$, is serially outputted into the concatenator 505, irrespective of the starting bit position in memory B. REG2, REG3 and the multiplexer 517 will read an entire data word from memory B and will send it out for concatenation at the concatenator 505. Reading of data from memory B is done word by word, irrespective of the starting bit position in memory B. The concatenator 505 comprises a register REG4, 506, which contains address pointer information. The address pointer information in REG4 points to the exact bit location in memory B, where the next "block tail" in sequence starts from. In this way, after the "block tail" is sent out and the EOB is encountered, the register REG4 will be used to point to a location in memory B where the next "block tail" can be read from.

The output of the concatenator 505 is sent for decoding by the variable length decoder 527. After decoding of each encoded symbol in the concatenated video data stream received from the concatenator 505, the decoder 527 provides a "size" information 529, which relates to the size, in bits, of the most recently decoded symbol. A "next" command 531 may also be provided, which will cause the concatenator 505 to feed the next portion of bits to the decoder. In order to ensure that the concatenator properly feeds the concatenated data to the decoder, a pair of registers REG0 and REG1, 407 and 409, and a multiplexer 511 may be utilized. The concatenated data may be fed into REG1. After receiving the "size" information 529 and the "next" command 531 from the decoder, the multiplexer 511 shifts the concatenated data "size" number of bits and then feeds the next portion of bits to the decoder.

In one embodiment of the present invention, the data words in each of the memories A and B may be, for example, 16 bits long. The registers REG0, REG1, REG2, REG3 and REG4 may be, for example, 16-bit registers. In this case, the multiplexer 517 will provide 16-bit portions of encoded data from memory B into the concatenator 505. Similarly, the multiplexer 511, will provide 16-bit portions of concatenated data into the decoder upon receiving of the "size" information 529 and the "next" command 531 by the decoder.

Figure 6:
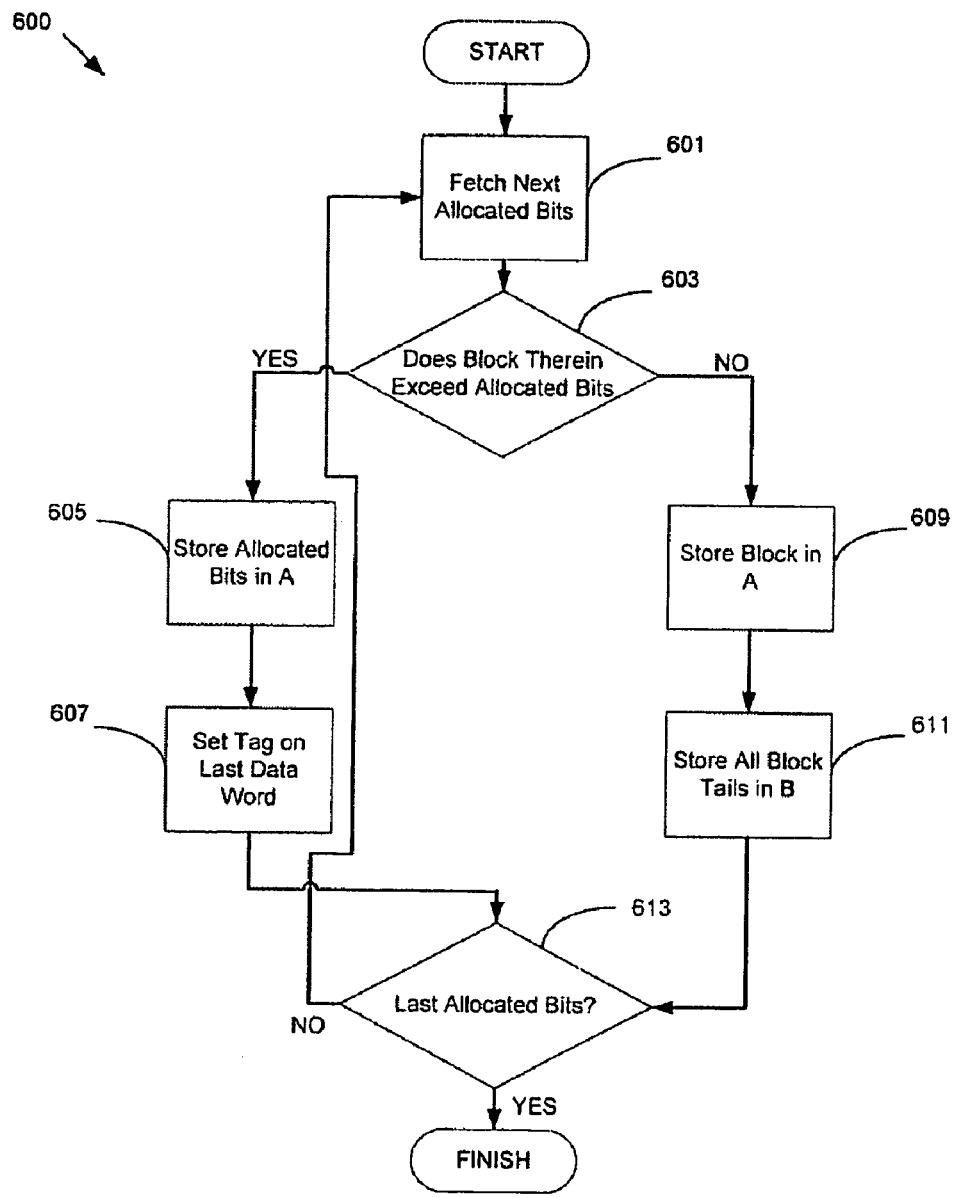
FIG. 6 illustrates a flow diagram of a first parsing cycle in the parsing circuit of FIG. 5, in accordance with an embodiment of the present invention.

Referring now to FIG. 6, there is illustrated a flow diagram of a first parsing cycle 600 in the parsing circuit of FIG. 5, in accordance with an embodiment of the present invention. A first parsing cycle 600 of encoded block data using an embodiment of the present invention will cause the encoded data to be distributed in memories A and B, so that encoded data in memory A may be decoded immediately, and encoded data in memory B may be decoded only after encoded data in memory A is decoded.

For example, the first parsing cycle 600 may start with step 601, where the next allocated bits are fetched into memory A. Query 603 ascertains whether the fetched block exceeds its allocated bits. If the fetched block exceeds its allocated bits, then, in step 605, the allocated bits are stored in memory A. Since the block exceeds the allocated bits, a tag is activated for the current data word, in step 607. If the fetched block does not exceed the allocated bits, then, in step 609, the fetched block is stored in memory A. The remaining portion of the allocated bits will contain one or more "block tails." In step 611, these "block tails" are stored in memory B. Query 613 ascertains whether the end of a macroblock is reached and whether all allocated bits have been parsed into memories A and B. If there are more remaining allocated bits, the cycle will repeat itself starting again from step 601.

Figure 7:
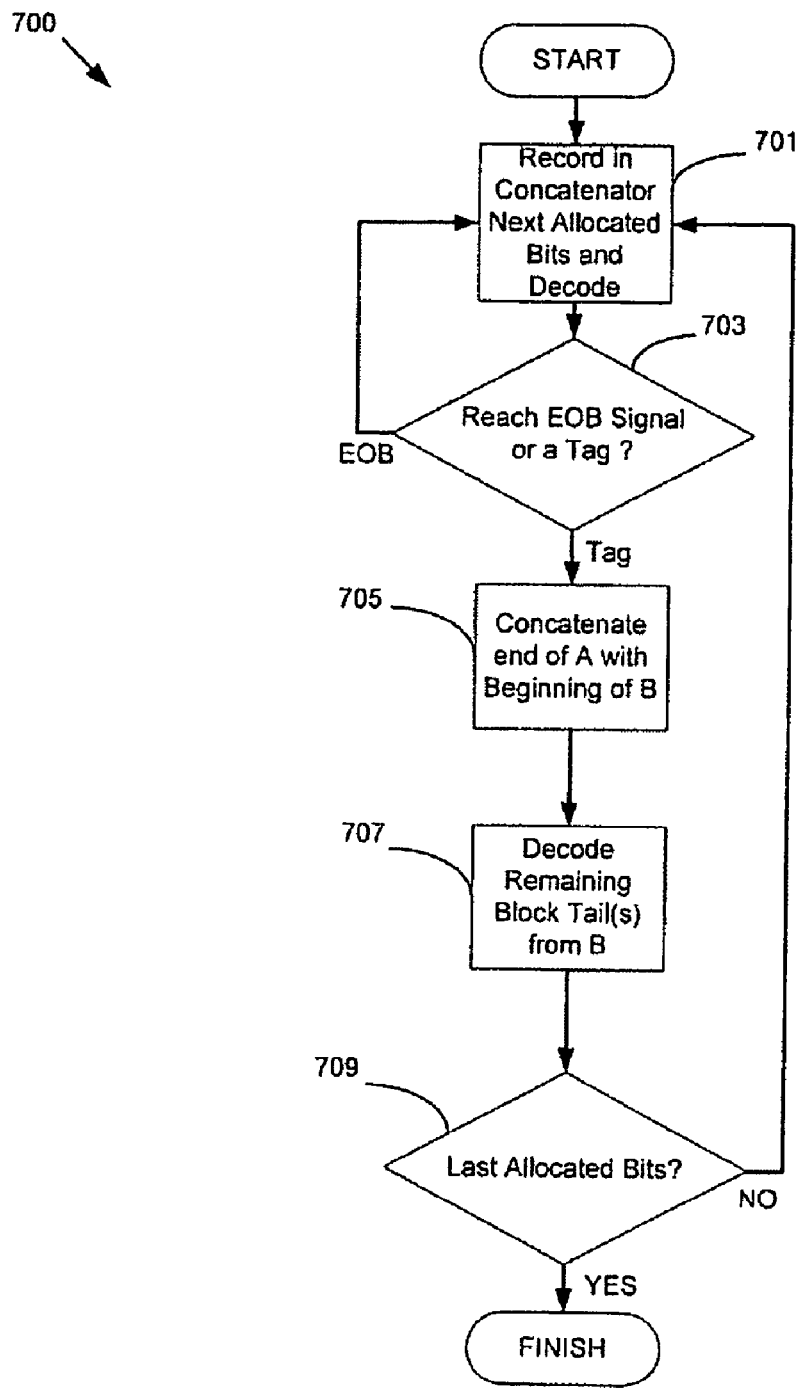
FIG. 7 illustrates a flow diagram of a second parsing cycle in the parsing circuit of FIG. 5, in accordance with an embodiment of the present invention.

Referring now to FIG. 7, there is illustrated a flow diagram of a second parsing cycle 700 in the parsing circuit of FIG. 5, in accordance with an embodiment of the present invention. A second parsing cycle 700 will decode all of the encoded data in memories A and B in accordance with an embodiment of the present invention.

For example, the second parsing cycle 700 may start with step 701, where the next allocated bits are fetched from memory A, recorded in the concatenator, and subsequently decoded. Query 703 ascertains whether an EOB signal or an active tag is reached during the parsing of the allocated bits in memory A. If an EOB signal is reached, it will indicate that there is no need to read a "block tail" from memory B and that reading from memory A, recording in the concatenator and subsequent decoding of the recorded data may continue. The cycle will, therefore, be directed to step 701 again. If, on the other hand, an active tag is reached while reading from memory A, this will indicate that the current block is smaller than its allocated bits and there is remaining "block tail" data in memory B. In step 705, the beginning portion of the allocated bits from memory A is concatenated with the beginning portion of the "block tail" data in memory B. In step 707 the remaining "block tail" portion, for the specific allocated bits, is fetched to the concatenator from memory B, and is subsequently decoded. Query 709 ascertains whether the last allocated bits were decoded. If there are more remaining allocated bits for decoding, the cycle will repeat itself starting again from step 701.

The first and the second pass of parsing may be carried out on one macroblock, or six encoded blocks, at a time. There may be a third pass of parsing encoded data, which may be carried out over an entire video segment, on a macroblock by macroblock basis, thus ensuring decoding of all video data that remains encoded after the first and the second pass.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. For example, although the foregoing embodiments have been described with respect to DV-25 coded video material, the invention is not so limited and can be practiced with other standards as well. Therefore, it is intended that the present invention not be limited to the particular embodiment disclosed, but that the present invention will include all embodiments falling within the scope of the appended claims.

What is claimed is:

1. A method for decoding an encoded video data stream, the method comprising:
    (a) receiving at a decoder, a first portion of an encoded two-dimensional block of pixel data immediately followed by a second encoded two-dimensional block of pixel data, the second block followed by another portion of the encoded two-dimensional block of pixel data;
    (b) generating a concatenated video data stream, wherein the portion of the first portion of the encoded two-dimensional block of pixel data is immediately followed by the another portion of the encoded two-dimensional block of pixel data; and
    (c) decoding the concatenated video data stream;
    wherein the receiving further comprises:
        storing the first portion of the encoded two-dimensional block of pixel data in a first memory region; and
        storing the second encoded two-dimensional block of pixel data in the first region of memory; and
        storing the another portion of the encoded two-dimensional block of pixel data in a second region of memory;
    wherein storing the first portion of the encoded data and the second portion of the encoded data further comprises:
        storing the first portion and the second portion of the encoded two-dimensional block of pixels or the second encoded two-dimensional block of pixel data in the first region until either a predetermined number of bytes of the first or second portion are stored in the first region or an end of block indicator is received; and
        if an end of block indicator is received storing the remainder first portion and the second portion of the encoded two-dimensional block of pixels or the second encoded two-dimensional block of pixel data;
    wherein the generating a concatenated encoded video stream comprises:
        (b1) serially outputting from the first memory region to a concatenator until either the predetermined number of bytes are received or the end of block indicator is received;
        (b2) if the predetermined number of bytes is serially output during step b1, serially outputting from the second memory region to the concatenator until an end of block indicator is received; and
        (b3) repeating steps b1 and b2.

2. The method according to claim 1, further comprising:
    (d) receiving input from the decoder, the input associated with the size of the decoded video data stream.

3. The method according to claim 2, wherein the input determines the amount of concatenated video data stream to be serially outputted to the decoder.

4. A system for decoding an encoded video data stream, the data stream comprising a plurality of encoded blocks of data pixels and a plurality of end of block indicators, the system comprising:
    an input for receiving the encoded video data stream comprising the plurality of encoded blocks of data pixels and the plurality of end of block indicators;
    a first memory buffer for storing either portions of the encoded video data stream of predetermined size or until the portions of the encoded video data stream until the portions include an end of block indicator received at the input;
    a second memory buffer for storing remainders of portions when the portions include an end of block indicator received at the input;
    a concatenator for concatenating from the first memory buffer and the second memory buffer, wherein the concatenator serially outputs data from the first memory buffer until either a predetermined number of bytes are serially output or an end of block is encountered and if the predetermined number of bytes are serially output from the first buffer, serially outputting from the second buffer until an end of buffer indicator is received, to obtain a concatenated video data stream; and
    a decoder for decoding the concatenated video data stream.

5. The system of claim 4, wherein the first memory buffer is configured to save at least one of an indicator flag and a data size information, the indicator flag having an active state and an inactive state.

6. The system of claim 5, wherein the indicator flag is activated if the first memory buffer is full.

7. The system of claim 5, wherein the data size information comprises a data size of the second portion.

8. The system of claim 4, wherein the decoder provides input, the input associated with the size of the decoded video data stream.

9. The system of claim 8, wherein the input from the decoder determines the amount of concatenated video data stream to be serially outputted to the decoder.

* * * * *